(12) United States Patent
Arikawa

(10) Patent No.: US 9,390,051 B2
(45) Date of Patent: Jul. 12, 2016

(54) ELECTRONIC CALCULATOR AND METHOD FOR CONTROLLING THE SAME

(71) Applicant: CASIO COMPUTER CO., LTD., Shibuya-ku, Tokyo (JP)

(72) Inventor: Kazuhiko Arikawa, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 324 days.

(21) Appl. No.: 14/086,461

(22) Filed: Nov. 21, 2013

(65) Prior Publication Data

US 2014/0082034 A1 Mar. 20, 2014

Related U.S. Application Data

(63) Continuation of application No. PCT/JP2011/070265, filed on Sep. 6, 2011.

(30) Foreign Application Priority Data

Jun. 16, 2011 (JP) ................................. 2011-134258

(51) Int. Cl.
*G06F 15/02* (2006.01)
(52) U.S. Cl.
CPC ..................................... *G06F 15/02* (2013.01)
(58) Field of Classification Search
CPC .......................................................... G06F 15/02
USPC ................................................ 708/130–170
See application file for complete search history.

(56) References Cited

U.S. PATENT DOCUMENTS 5,969,974 A * 10/1999 Vandenbelt ......... G06F 15/0258
235/435

FOREIGN PATENT DOCUMENTS

| JP | 2-85952 A | 3/1990 |
|---|---|---|
| JP | 03050661 A | 3/1991 |
| JP | 5-217074 A | 8/1993 |
| JP | 6-11582 A | 1/1994 |
| JP | 11282810 A | 10/1999 |
| JP | 2000-90265 A | 3/2000 |

(Continued)

OTHER PUBLICATIONS

International Search Report (ISR) dated Dec. 6, 2011 (and English translation thereof) in International Application No. PCT/JP2011/070265.

(Continued)

*Primary Examiner* — Tan V. Mai
(74) *Attorney, Agent, or Firm* — Holtz, Holtz & Volek PC

(57) ABSTRACT

An electronic calculator includes first and second display sections, a conversion rate storage unit configured to store a plurality of conversion rates, a conversion rate display unit configured to call the plurality of conversion rates in sequence from the conversion rate storage unit and display the conversion rates on the second display section, a numerical value display unit configured to display a numerical value on the first display section according to a user operation, and a numerical value conversion unit configured to convert the numerical value displayed on the first display section by the numerical value display unit so as to correspond to a conversion transition designated by a user operation, based on a conversion rate displayed on the second display section by the conversion rate display unit.

6 Claims, 10 Drawing Sheets

(56) References Cited

FOREIGN PATENT DOCUMENTS

| | | | |
|---|---|---|---|
| JP | 2000132517 | A | 5/2000 |
| JP | 2000-311142 | A | 11/2000 |
| JP | 2000-315195 | A | 11/2000 |
| JP | 2001-109721 | A | 4/2001 |
| JP | 2006293498 | A | 10/2006 |

OTHER PUBLICATIONS

Chinese Office Action (and English translation thereof) dated Jul. 27, 2015, issued in counterpart Chinese Application No. 201180071667.5.

English translation of an International Preliminary Report on Patentability (IPRP) including Written Opinion dated Jan. 3, 2014 in parent International Application No. PCT/JP2011/070265.

Japanese Office Action (and English translation thereof) dated Aug. 25, 2015, issued in counterpart Japanese Application No. 2011-134258.

Japanese Office Action (and English translation thereof) dated Mar. 15, 2016, issued in counterpart Japanese Application No. 2011-134258.

* cited by examiner

(B) [EXCH] —14e | 50. —12 | EX1 RATE 80. —13

(C) [×EXCH] —14e1 | 4'000. —12 | EX1 RATE 80. —13

(D) [+] | 4'000. ⊞ —12 | EX1 RATE 80. —13

(E) [SELECTION] —16 | 4'000. ⊞ —12 | ACTIVE 0. —13

(F) 25 [×] 4 [=] | 4'000. ⊞ —12 | ACTIVE 100. —13

(G) [SELECTION] —16 | 4'000. ⊞ —12 | 100. —13

(I)  [EXCH] [EXCH]  　　　　　　　100.  
　　　　14e  　　　　EX2 RATE　110.

(J)  [×EXCH]—14e1  　　　　　11'000.  
　　　　　　　　　　　EX2 RATE　110.

(K)  [+]  　　　　　　　　　　15'000.  
　　　　　　　　　　　　　　　　　0.

(L)  6500  　　　　　　　　　　6'500.  
　　　　　　　　　　　　　　　　　0.

(M)  [=]  　　　　　　　　　　21'500.  
　　　　　　　　　　　　　　　　　0.

ELECTRONIC CALCULATOR AND METHOD FOR CONTROLLING THE SAME

CROSS-REFERENCE TO RELATED APPLICATIONS

This application is a Continuation Application of PCT Application No. PCT/JP2011/070265, filed Sep. 6, 2011 and based upon and claiming the benefit of priority from prior Japanese Patent Application No. 2011-134258, filed Jun. 16, 2011, the entire contents of all of which are incorporated herein by reference.

BACKGROUND OF THE INVENTION

1. Field of the Invention

The present invention relates to an electronic calculator having an auxiliary display screen and a method for controlling the electronic calculator.

2. Description of the Related Art

Desktop electronic calculators have been devised each of which includes two numeral display areas, upper and lower, in which a tax inclusive amount and a tax exclusive amount are displayed in comparison with each other as a result of calculation (see patent document 1, for example).

Calculating devices have been devised in which a plurality of currencies, such as euros and dollars, are displayed in parallel in different rows and when an arbitrary currency is designated and its numerical value is input, the currency is converted on the basis of the input numerical value and the converted currency amount is displayed (see patent documents 2 and 3, for example).

3. Patent Documents

Patent Document 1: Jpn. Pat. Appln. KOKAI Publication No. 2001-109721

Patent Document 2: Jpn. Pat. Appln. KOKAI Publication No. 2000-315195

Patent Document 3: Jpn. Pat. Appln. KOKAI Publication No. 2000-311142

In conventional calculating devices, a user was able to display a plurality of converted currency amounts in parallel, whereas the user was not able to confirm a conversion rate or designate a conversion transition (e.g., [$→¥ (multiplication)] and [¥→dollar (division)]) by a simple operation in the conversion process.

In particular, when a plurality of conversion rates are used, it was difficult for the user to know which of the conversion rates is used to perform a conversion process.

BRIEF SUMMARY OF THE INVENTION

The present invention has been developed to solve the above problem and its object is to provide an electronic calculator having an auxiliary display screen capable of confirming a conversion rate and designating a conversion transition by a simple operation in performing a numeral value conversion process, and a method for controlling the electronic calculator.

An electronic calculator according to the present invention comprises first and second display sections, a conversion rate storage unit configured to store a plurality of conversion rates, a conversion rate display unit configured to call the plurality of conversion rates in sequence from the conversion rate storage unit and display the conversion rates on the second display section, a numerical value display unit configured to display a numerical value on the first display section according to a user operation, and a numerical value conversion unit configured to convert the numerical value displayed on the first display section by the numerical value display unit so as to correspond to a conversion transition designated by a user operation, based on a conversion rate displayed on the second display section by the conversion rate display unit.

A method according to the present invention is for controlling a computer of an electronic device including first and second display sections and a memory which stores a plurality of conversion rates, and the method comprises calling the plurality of conversion rates in sequence from the memory and displaying the conversion rates on the second display section, displaying a numerical value on the first display section according to a user operation, and converting the numerical value displayed on the first display section in the numerical value displaying step so as to correspond to a conversion transition designated by a user operation, based on a conversion rate displayed on the second display section.

The present invention makes it possible to confirm a conversion rate and designate a conversion transition by a simple operation in performing a numeral value conversion process.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 11 is a chart showing a first specific example of a conversion displaying operation of the electronic calculator 10; and FIG. 12 is a chart showing a second specific example of the conversion displaying operation of the electronic calculator 10.

DETAILED DESCRIPTION OF THE INVENTION

An embodiment of the present invention will be described below with reference to the accompanying drawings.

Figure 1:
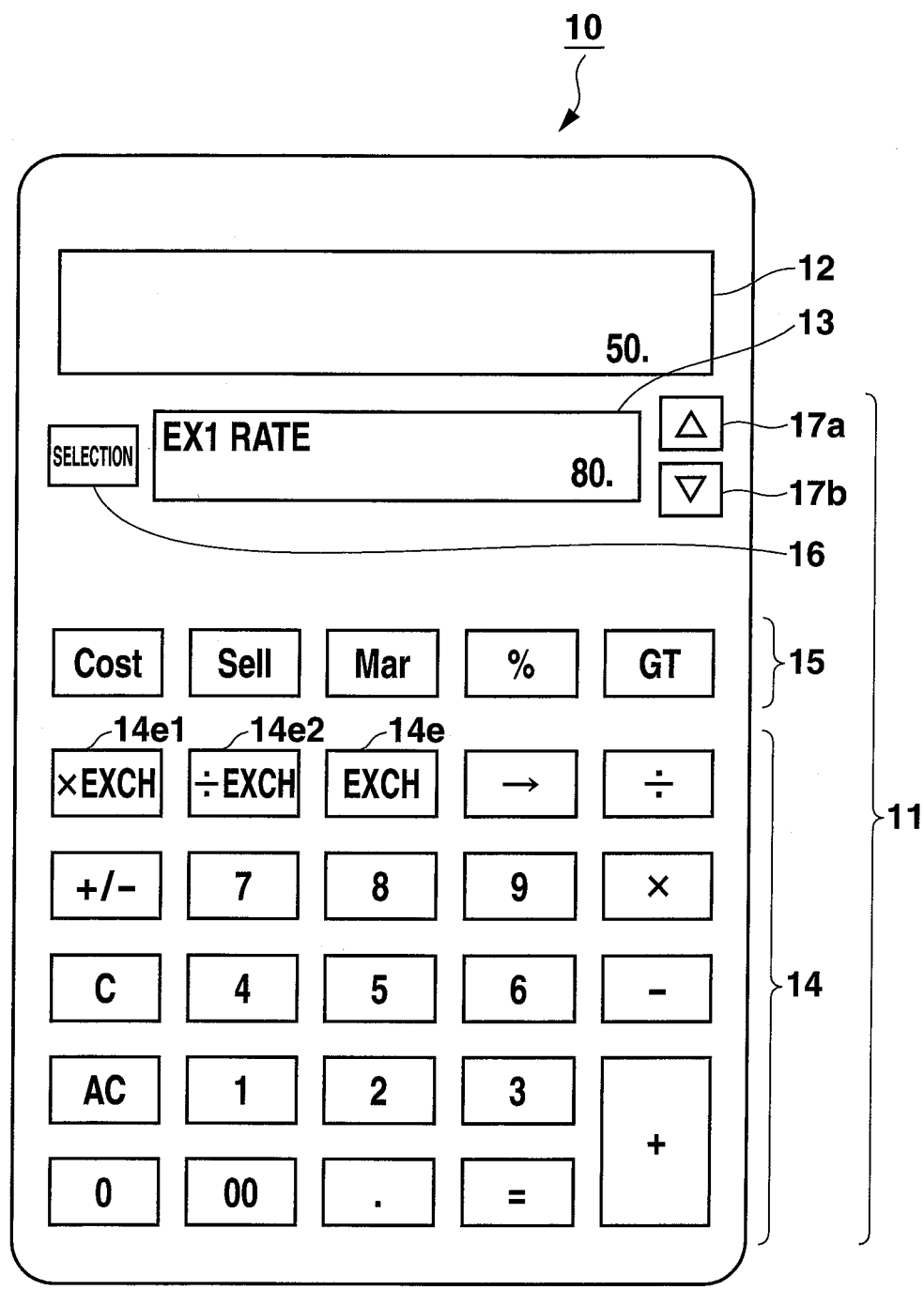
FIG. 1 is a front view showing an outward appearance of an electronic calculator 10 having an auxiliary display screen according to an embodiment of the present invention.

FIG. 1 is a front view showing an external appearance of an electronic calculator 10 having an auxiliary display screen according to the embodiment of the present invention.

The electronic calculator 10 includes a key input section 11, a dot matrix type main display section 12 and an auxiliary display section 13 on its front surface. The auxiliary display section 13 is arranged under the main display section 12 and the display area of the section 13 is smaller than that of the section 12.

The key input section 11 includes a numerical key and operation symbol key group 14 for inputting a numerical value and giving an instruction to perform calculation, a calculation type setting key group 15 for setting a type of calculation, a "selection" key 16 for selecting an active display section from the main display section 12 and auxiliary display section 13, and a "Δ" key 17a and a "∇" key 17b for displacing calculated data between the main display section 12 and the auxiliary display section 13.

The numerical key and operation symbol key group 14 includes numerical keys "0" to "9", arithmetic symbol keys "+", "−", "×", "÷" and "=" and an "AC" (clear) key and also includes an "EXCH" key 14e for calling and displaying the registered different conversion rates in sequence on the auxiliary display section 13, a "×EXCH" key 14e1 and a "÷EXCH" key 14e2 for designating a conversion transition. The "×EXCH" key 14e1 provides an instruction to multiply a numerical value displayed on the main display section 12 by a conversion rate, and the "÷EXCH" key 14e2 provides an instruction to divide a numerical value displayed on the main display section 12 by a conversion rate.

Figure 2:
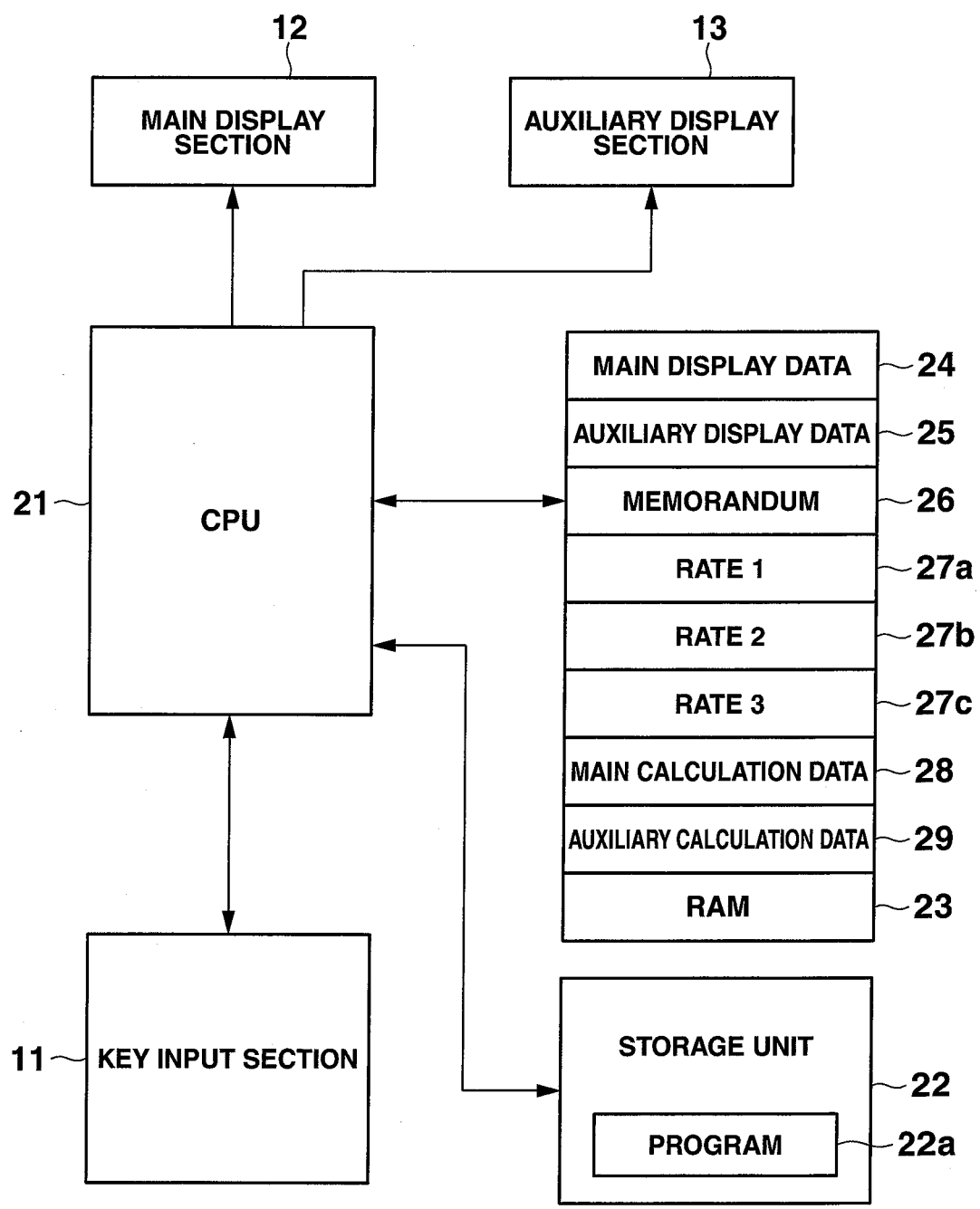
FIG. 2 is a block diagram showing a configuration of an electronic circuit of the electronic calculator 10 having an auxiliary display screen.

FIG. 2 is a block diagram showing a configuration of an electronic circuit of the electronic calculator 10 with the auxiliary display screen.

The electronic calculator 10 includes a control unit (CPU) 21 that serves as a computer.

The control unit (CPU) 21 controls the operation of each section of the electronic circuit using a RAM 23 as a work memory in accordance with a system program prestored in a storage unit (flash ROM) 22 and a calculator control program 22a prestored in the storage unit 22 or read into the storage unit 22 from outside. The system program and calculator control program 22a stored in the storage unit 22 are started in response to a key input signal from the key input section 11.

The main display section 12 and auxiliary display section 13 as well as the storage unit 22, RAM 23 and key input section 11 are connected to the control unit (CPU) 21.

The RAM 23 includes storage areas of a main display data memory 24, an auxiliary display data memory 25, a memorandum data memory 26, a conversion rate 1 memory 27a, a conversion rate 2 memory 27b, a conversion rate 3 memory 27c, a main calculation data memory 28, an auxiliary calculation data memory 29 and the like.

The main display data memory 24 stores display data, such as numerals and operation symbols, which is to be displayed on the main display section 12, as bit map data.

The auxiliary display data memory 25 stores display data, such as numerals and operation symbols, which is to be displayed on the auxiliary display section 13, as bit map data.

The memorandum data memory 26 stores calculation data displayed on one of the main and auxiliary display sections 12 and 13, which is selected in response to an input signal from the "Δ" key 17a or the "∇" key 17b.

The conversion rate 1-3 memories 27a-27c store conversion (exchange) rates of a reference unit (e.g., yen) for different numerical units (e.g., dollar, euro and renminbi) according to a user's operation. For example, the conversion rate 1 memory 27a stores the exchange rate at 80 yen to the dollar, the conversion rate 2 memory 27b stores the exchange rate at 110 yen to the euro, and the conversion rate 3 memory 27c stores the exchange rate at 12 yen to the renminbi.

The main calculation data memory 28 stores calculation data to be displayed on the main display section 12.

The auxiliary calculation data memory 29 stores calculation data to be displayed on the auxiliary display section 13.

The electronic calculator 10 having an auxiliary display screen so configured fulfills a function as will be described below by causing the CPU 21 to control the operation of each section of the electronic circuit in accordance with the instructions described in the calculator control program 22a and causing software and hardware to cooperate with each other.

An operation of the electronic calculator 10 having an auxiliary display screen so configured will be described below.

Figure 3:
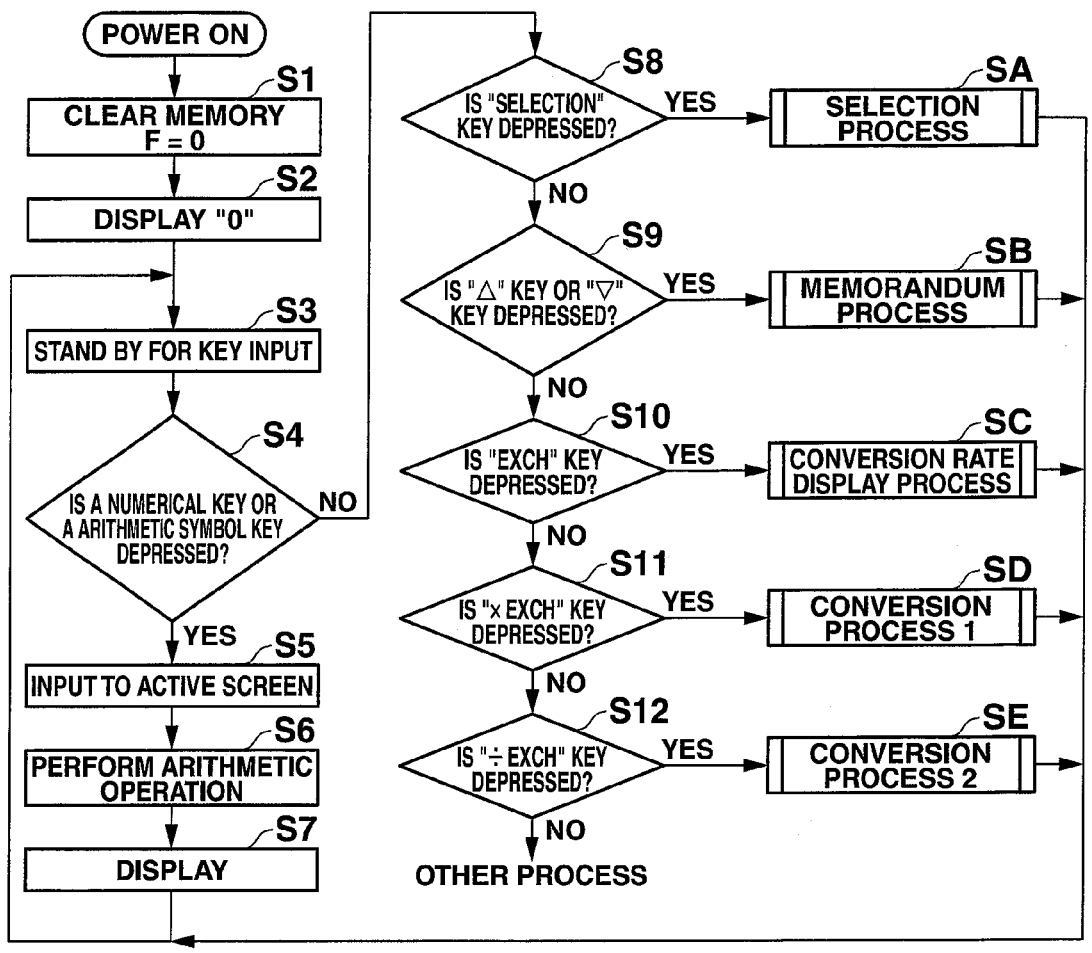
FIG. 3 is a flowchart showing the entire process of the electronic calculator 10.

FIG. 3 is a flowchart showing the entire process of the electronic calculator 10.

When the electronic calculator 10 is powered on, the contents of the main display data memory 24, auxiliary display data memory 25, memorandum data memory 26, main calculation data memory 28 and auxiliary calculation data memory 29 in the RAM 23 are cleared. Flag data F (not shown) indicating which of the two display sections is made active is set to 0 (F=0) and the main display section 12 is made active (step S1).

Thus, "0" is displayed on each of the main display section 12 and auxiliary display section 13 (step S2), and the calculator 10 is set in a key input standby state (step S3).

When a numerical key or an arithmetic symbol key of the numerical key and operation symbol key group 14 is depressed on the currently active display section (the default is the main display section 12) according to a user's desired calculation (Yes in step S4), the corresponding arithmetic calculation is performed (steps S5 and S6) and a result of the calculation is displayed thereon (step S7).

Figure 4:
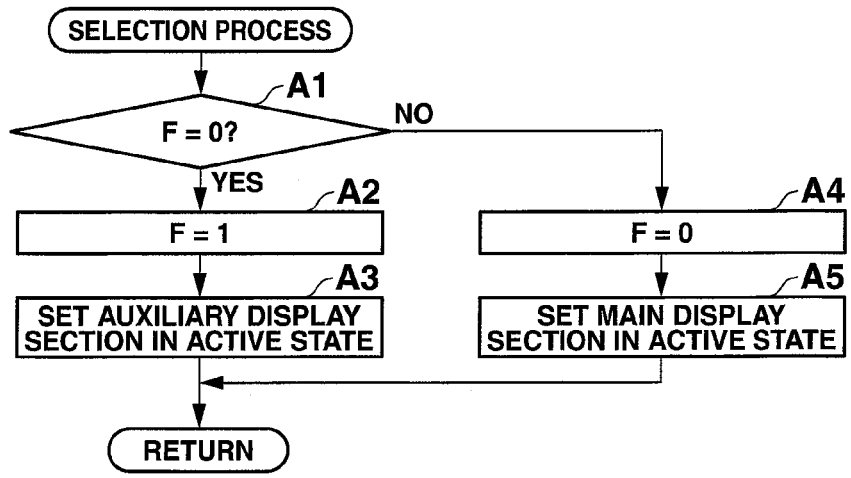
FIG. 4 is a flowchart showing a selecting process included in the entire process of the electronic calculator 10.

When the "selection" key 16 is depressed (Yes in step S8), the flow moves to the selecting process shown in FIG. 4 (step SA).

FIG. 4 is a flowchart showing a selecting process included in the entire process of the electronic calculator 10.

Each time the "selection" key 16 is depressed, it is determined whether the flag data F managed by the RAM 23 is set to 0 (F=0) (step A1). If it is determined that the flag data F is set to 0 (F=0) (Yes in step A1), it is set to 1 (F=1) (step A2), and the auxiliary display section 13 is set in an active state (step A3).

If it is determined that the flag data F managed by the RAM 23 is set to 1 (F=1) when the "selection" key 16 is depressed (No in step A1), it is set to 0 (F=0) (step A4), and the main display section 12 is set in an active state (step A5).

Figure 5:
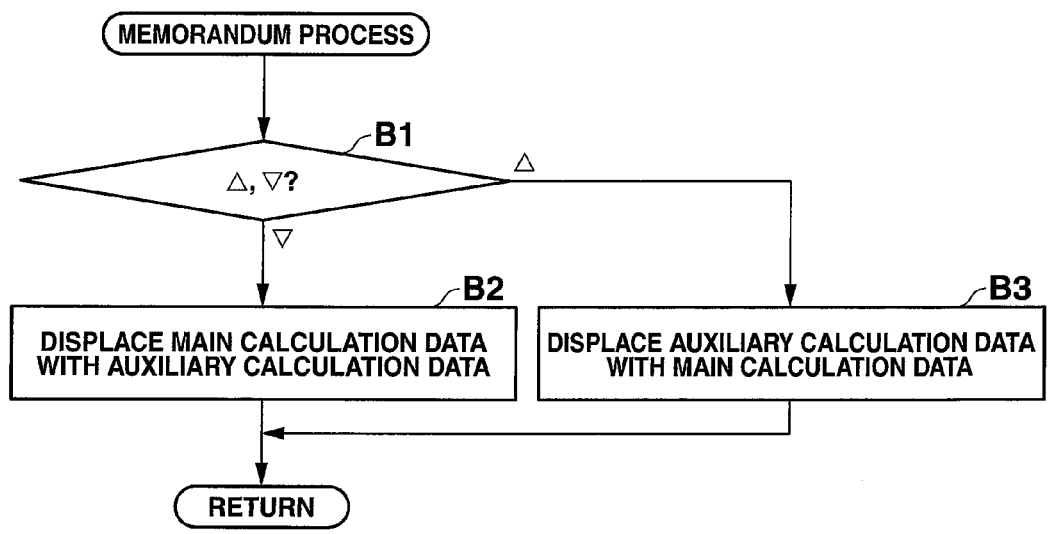
FIG. 5 is a flowchart showing a memorandum process included in the entire process of the electronic calculator 10.

When the "Δ" key 17a or the "∇" key 17b is depressed (Yes in step S9), the flow moves to the memorandum process shown in FIG. 5 (step SB).

FIG. 5 is a flowchart showing a memorandum process included in the entire process of the electronic calculator 10.

In the memorandum process, when it is determined that the "∇" key 17*b* is depressed (step B1 (∇)), the calculation data, which is stored in the main calculation data memory 28 and which is stored in the main display data memory 24 and displayed on the main display section 12, is displaced to and stored in the auxiliary calculation data memory 29 and written to the auxiliary display data memory 25 and displayed on the auxiliary display section 13 (step B2). The auxiliary calculation data which is already displayed on the auxiliary display section 13 is saved and stored in the memorandum data memory 26.

If it is determined that the "Δ" key 17*a* is depressed (step B1 (Δ)), the calculation data, which is stored in the auxiliary calculation data memory 29 and which is stored in the auxiliary display data memory 25 and displayed on the auxiliary display section 13, is displaced to and stored in the main calculation data memory 28 and written to the main display data memory 24 and displayed on the main display section 12 (step B3). The main calculation data which is already displayed on the main display section 12 is saved and stored in the memorandum data memory 26.

Figure 6:
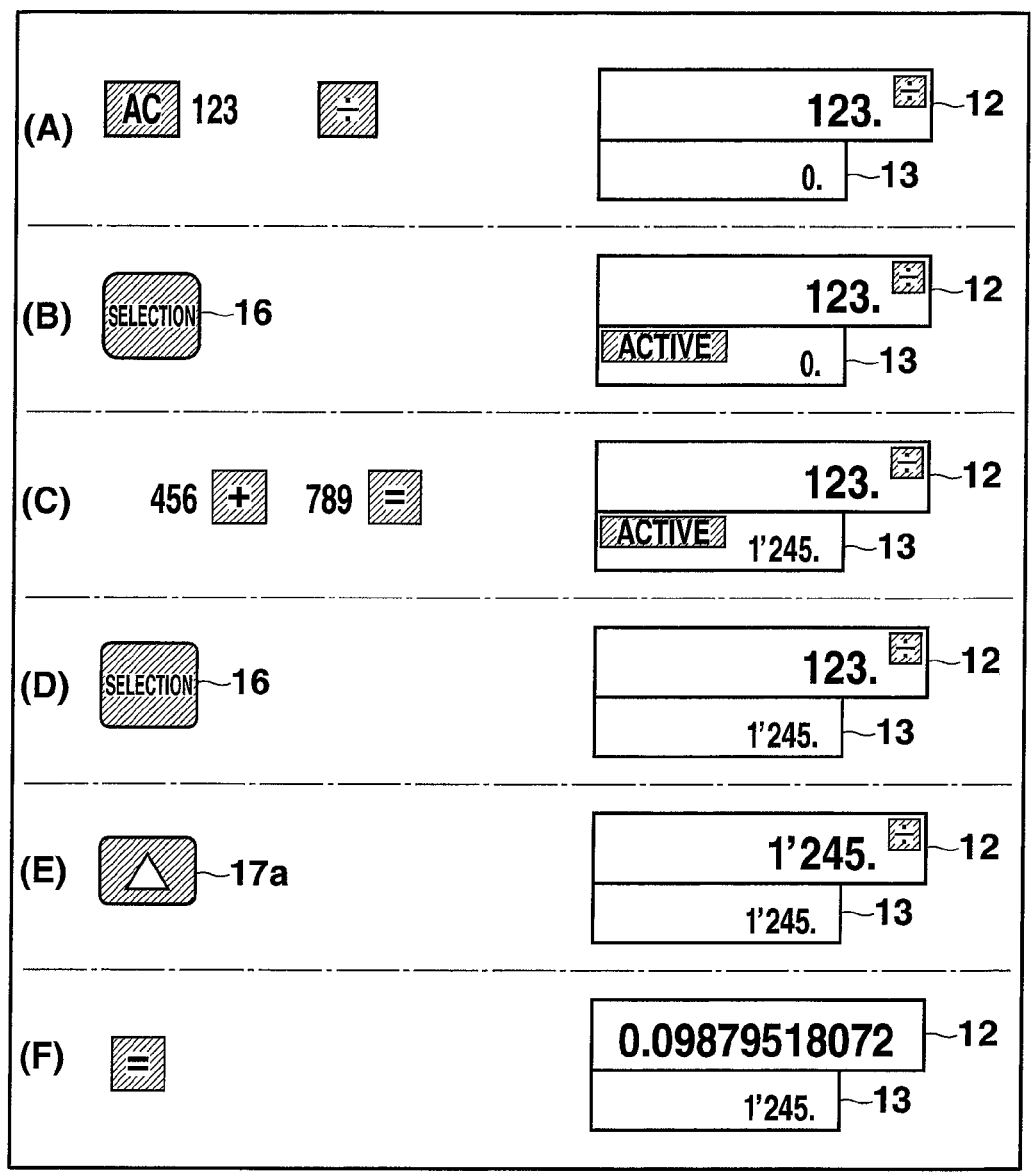
FIG. 6 is a chart showing a first specific example of a calculation displaying operation of the electronic calculator 10.

FIG. 6 is a chart showing a first specific example of a calculation displaying operation of the electronic calculator 10.

An example of calculation "123÷(456+789)" will be given. After the clear key "AC" is depressed to clear the memories while the main display section 12 is active, as shown in FIG. 6(A), the numerical and operation symbol keys are depressed to input calculation data "123" and "÷". Then, the input calculation data "123" and "÷" are stored in the main calculation data memory 28 and written to the main display data memory 24, and then displayed on the main display section 12 (steps S3 to S7).

When the "selection" key 16 is depressed (Yes in step S8→step SA), as shown in FIG. 6(B), the auxiliary display section 13 is made active (steps A1 to A3). When the numerical and operation symbol keys are depressed to input calculation data "456", "+", "789" and "=" as shown in FIG. 6(C), arithmetic calculation is performed in accordance with the input calculation data, and data "1'245" of the calculation result is stored in the auxiliary calculation data memory 29 and written to the auxiliary display data memory 25, and then displayed on the auxiliary display section 13 (steps S3 to S7).

The "selection" key 16 is depressed again to make the main display section 12 active, as shown in FIG. 6(D) (Yes in step S8→step SA (No in step A1→steps A4 and A5)), and the "Δ" key 17*a* is depressed, as shown in FIG. 6(E) (Yes in step S9→step SB). Thus, the calculation data "1'245" stored in the auxiliary calculation data memory 29 is transferred to the main calculation data memory 28 and written to the main display data memory 24, and then displayed on the main display section 12 (step B1→step B3). The calculation data "123" and "÷" displayed on the main display section 12 are saved and stored in the memorandum data memory 26.

When the "=" key is depressed, as shown in FIG. 6(F), arithmetic calculation is performed in accordance with the calculation data "123" and "÷" saved in the memorandum data memory 26 and the calculation data "1'245" displaced to and displayed on the main display section 12 that is active, and data "0.09879518072" of the calculation result is stored in the main calculation data memory 28 and written to the main display data memory 24, and then displayed on the main display section 12 (steps S3 to S7).

Thus, in order to perform the above calculation "123÷(456+789)", the initial calculation data "123÷" is displayed and held on the main display section 12 and its subsequent calculation data "456+789" is displaced to the auxiliary display section 13 for calculation. A result "1'245" of the calculation is returned to the main display section 12, thereby obtaining the final calculation result (123÷1'245=) "0.09879518072." Therefore, a user is able to perform his or her desired calculation by a simple and clear operation without performing an uncertain calculating operation which necessitates a user's own memory and a conventional memory whose contents cannot be checked when necessary.

Figure 7:
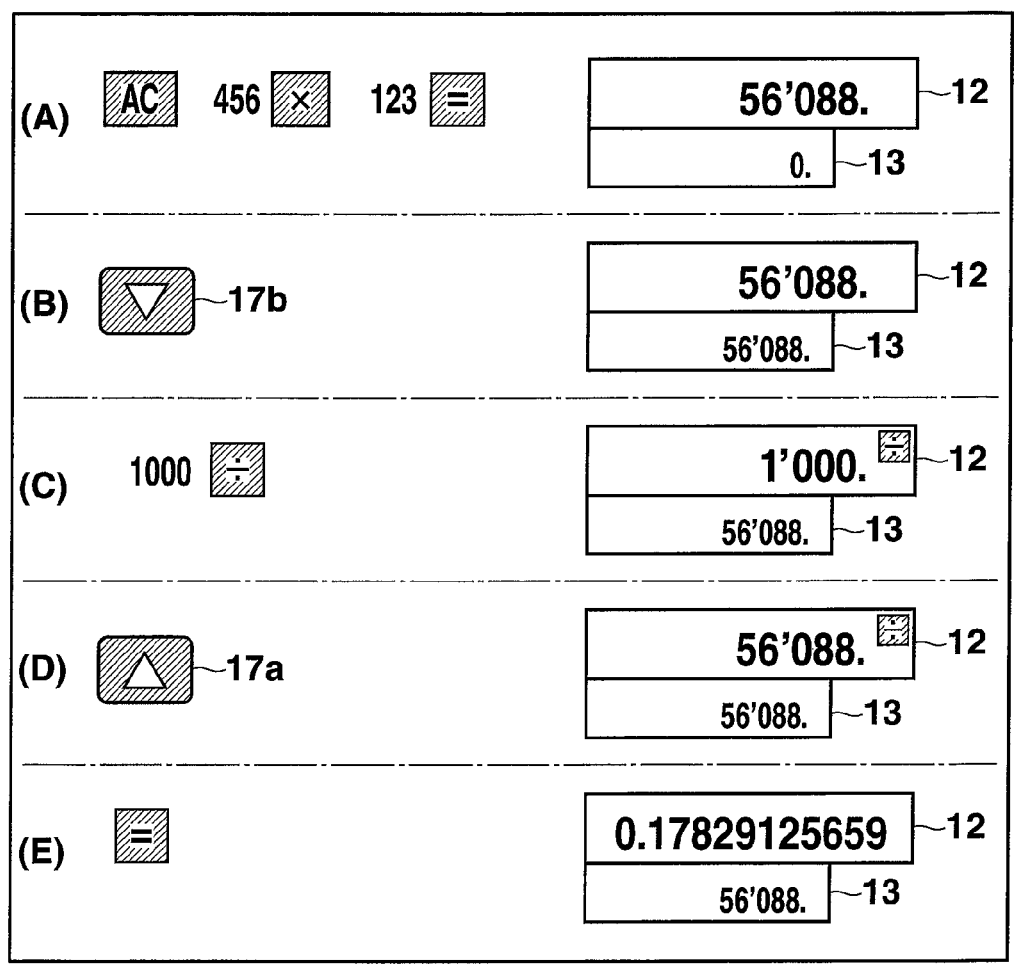
FIG. 7 is a chart showing a second specific example of the calculation displaying operation of the electronic calculator 10.

FIG. 7 is a chart showing a second specific example of the calculation displaying operation of the electronic calculator 10.

An example of performing the calculation "456×123=56088" and then the calculation "1000÷56088" using a result of the former calculation will be given. As shown in FIG. 7(A), the calculation "456×123=" is performed while the main display section 12 is active and a result "56'088" of the calculation is displayed (steps S1 to S7).

As shown in FIG. 7(B), the "∇" key 17*b* is depressed to displace the calculation result "56'088" from the main display section 12 to the auxiliary display section 13 and display it thereon (Yes in step S9→step SB (steps B1 and B2)).

The numerical and operation symbol keys are depressed to input and display calculation data "1000" and "÷" on the main display section 12 that remains active, as shown in FIG. 7(C) (steps S3 to S7) and then the "Δ" key 17*a* is depressed to displace the calculation result "56'088" from the auxiliary display 13 to the main display section 12 and display it thereon, as shown in FIG. 7(D) (Yes in step S9→step SB (step B1→step B3). The calculation data "1000" and "÷" displayed on the main display section 12 are saved and stored in the memorandum data memory 26.

When the "=" key is depressed, as shown in FIG. 7(E), arithmetic calculation is performed in accordance with the calculation data "1000" and "÷" saved in the memorandum data memory 26 and the calculation data "56'088" displaced to and displayed on the main display section 12, and data "0.17829125659" of the calculation result is stored in the main calculation data memory 28 and written to the main display data memory 24, and then displayed on the main display section 12 (steps S3 to S7).

Thus, in order to perform the above calculation "1000÷(456×123)", the initial calculation "456×123=" is performed on the main display section 12. While the calculation data "56'088" is displayed and held on the auxiliary display section 13, the next calculation data "1000÷" is input and displayed on the main display section 12. The calculation result "56'088" displayed and held on the auxiliary display section 13 is returned to the main display section 12, thereby obtaining the final calculation result (1000÷56'088=) "0.17829125659". Therefore, a user is able to perform his or her desired calculation by a simple and clear operation without performing an uncertain calculating operation which necessitates a user's own memory and a conventional memory whose contents cannot be checked when necessary.

Figure 8:
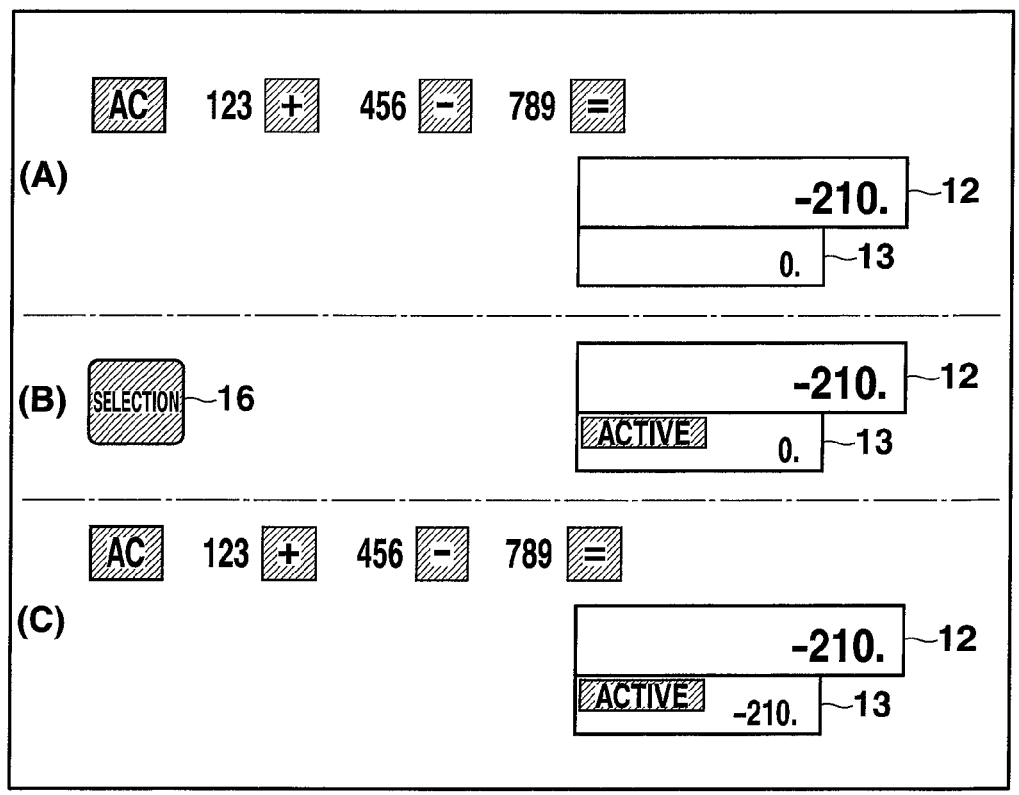
FIG. 8 is a chart showing a third specific example of the calculation displaying operation of the electronic calculator 10.

FIG. 8 is a chart showing a third specific example of the calculation displaying operation of the electronic calculator 10.

An example of calculation "123+456−789" and its proof will be described. As shown in (A) of FIG. 8, when the main display section 12 is active, a calculating operation of "123+456−789=" is performed and its calculation result "−210" is displayed (steps S1 to S7).

While the calculation result "−210" is displayed on the main display section 12, the "selection" key 16 is depressed to make the auxiliary display section 13 active, as shown in (B) of FIG. 8 (Yes in step 8→step SA (steps A1 to A3).

As shown in (C) of FIG. 8, a proving operation of "123+ 456−789=" is performed and its proof result "−210" is displayed on the auxiliary display section 13 (steps S1 to S7).

Accordingly, a target calculating operation and its proving operation can be performed on the main display section 12 and auxiliary display section 13 which are simply arranged up and down.

Figure 9:
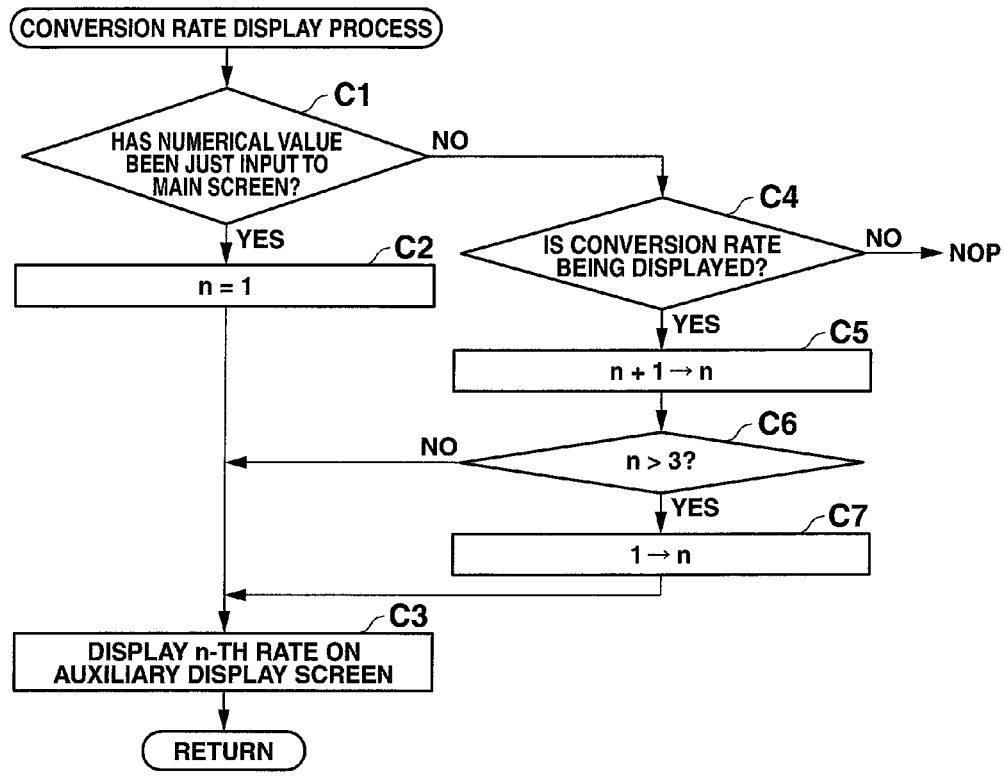
FIG. 9 is a flowchart showing a conversion rate displaying process included in the entire process of the electronic calculator 10.

FIG. 9 is a flowchart showing a conversion rate displaying process included in the entire process of the electronic calculator 10.

While the calculator 10 is in the key input standby state (step S3), if the "EXCH" key 14e is depressed (Yes in step S10), the flow moves to the conversion rate displaying process shown in FIG. 9 (step SC) to determine whether a numerical value has just been input to the main display section 12 (main display data memory 24) (step C1) or a conversion rate is displayed on the auxiliary display section 13 (auxiliary display data memory 25) (step C4).

When it is determined that a numerical value has just been input to the main display section 12 (main display data memory 24) (Yes in step C1), the counter n managed in the RAM 23 is initially set to 1 (n=1) (step C2), a conversion rate is read out of the conversion rate 1 memory 27a, stored in the auxiliary calculation data memory 29 and written to the auxiliary display data memory 25, and then displayed on the auxiliary display section 13 (step C3).

When it is determined that the conversion rate is displayed on the auxiliary display section 13 (auxiliary display data memory 25) (Yes in step C4), the counter n managed in the RAM 23 is incremented (n+1→n) (step C5), and it is determined whether n is larger than 3 (n>3) (step C6).

When it is determined that n is not larger than 3 (n≤3) (No in step C6), a conversion rate is read out of the conversion rate n memory (27a to 27c) corresponding to the counter n, stored in the auxiliary calculation data memory 29 and written to the auxiliary display data memory 25, and then displayed on the auxiliary display section 13 (step C3).

when it is determined that n is larger than 3 (n>3) (Yes in step C6), the counter n is reset to 1 (n=1) (step C7), a conversion rate is read out of the conversion rate 1 memory 27a, stored in the auxiliary calculation data memory 29 and written to the auxiliary display data memory 25, and then displayed on the auxiliary display section 13 (step C3).

In the conversion rate displaying process (step SC), each time the [EXCH] key 14e is depressed after a numerical value is input to the main display section 12, three different conversion rates are read out of the conversion rate 1-3 memories 27a to 27c in sequence and displayed on the auxiliary display section 13.

Figure 10:
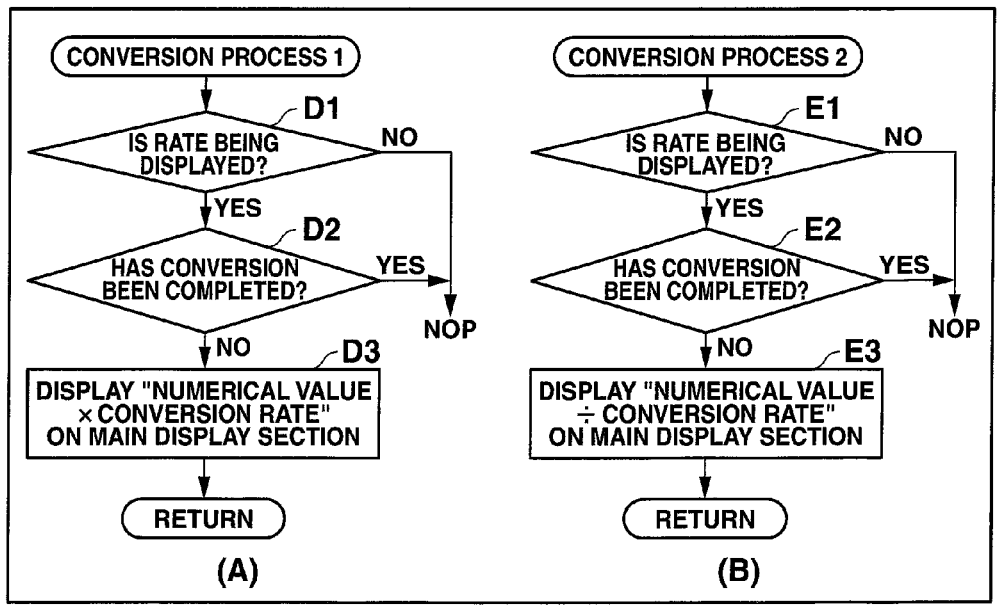
FIG. 10(A) is a flowchart showing a first conversion process included in the entire process of the electronic calculator 10.
FIG. 10(B) is a flowchart showing a second conversion process included in the entire process of the electronic calculator 10.

FIG. 10(A) is a flowchart showing a first conversion process included in the entire process of the electronic calculator 10, and FIG. 10(B) is a flowchart showing a second conversion process included in the entire process of the electronic calculator 10.

While the calculator 10 is in the key input standby state (step S3), if the "×EXCH" key 14e1 is depressed (Yes in step S11), the flow moves to the first conversion process shown in FIG. 10(A) (step SD) to determine whether a conversion rate is displayed on the auxiliary display section 13 (step D1).

When it is determined that a conversion rate is displayed on the auxiliary display section 13 (Yes in step D1), it is also determined that a conversion process has already been completed (step D2). If it is determined that a conversion process has not yet been completed (No in step D2), the numerical value input to and displayed on the main display section 12 (main display data memory 24) is multiplied by the conversion rate displayed on the auxiliary display section 13 (auxiliary display data memory 25), and the multiplication result is stored in the main calculation data memory 28 and written to the main display data memory 24, and then displayed on the main display section 12 (step D3).

While the calculator 10 is in the key input standby state (step S3), if the "÷EXCH" key 14e2 is depressed (Yes in step S12), the flow moves to the second conversion process shown in FIG. 10(B) (step SE) to determine whether a conversion rate is displayed on the auxiliary display section 13 (step E1).

When it is determined that a conversion rate is displayed on the auxiliary display section 13 (Yes in step E1), it is also determined that a conversion process has already been completed (step E2). If it is determined that a conversion process has not yet been completed (No in step E2), the numerical value input to and displayed on the main display section 12 (main display data memory 24) is divided by the conversion rate displayed on the auxiliary display section 13 (auxiliary data memory 25), and the division result is stored in the main calculation data memory 28 and written to the main display data memory 24, and then displayed on the main display section 12 (step E3).

In the first conversion process (step SD), a numerical value of, e.g., dollars displayed on the main display section 12 can be multiplied by, e.g., the dollar-to-yen conversion rate displayed on the auxiliary display section 13 to perform a currency conversion from dollars to yen. In the second conversion process (step SE), a numerical value of, e.g., yen displayed on the main display section 12 can be divided by, e.g., the dollar-to-yen conversion rate displayed on the auxiliary display section 13 to perform a currency conversion from yen to dollars.

FIG. 11 is a chart showing a first specific example of a conversion displaying operation of the electronic calculator 10.

FIG. 12 is a chart showing a second specific example of the conversion displaying operation of the electronic calculator 10.

To convert "$50+€(25×4)+¥6500" into yen, if a dollar value of "50" is input while the main display section 12 is active, as shown in (A) of FIG. 11, the input dollar value "50" is displayed on the main display section 12 (main display data memory 24) (steps S1 to S7).

As shown in (B) of FIG. 11, the [EXCH] key 14e is depressed to display the dollar-to-yen conversion rate "80", which is stored in the conversion rate 1 memory 27a, on the auxiliary display section 13 (auxiliary display data memory 25) (Yes in step S10→SC (steps C1 to C3). As shown in (C) of FIG. 11, when the [×EXCH] key 14e1 is depressed (Yes in step S11), a dollar-to-yen conversion result "4'000", which is obtained by multiplying the dollar value "50" of the main display section 12 (main calculation data memory 28) by the dollar-to-yen conversion rate "80" of the auxiliary display section 13 (auxiliary calculation data memory 29), is stored in the main calculation data memory 28 and written to the main display data memory 24, and then displayed on the main display section 12 (step SD (steps D1 to D3).

As shown in (D) of FIG. 11, the "+" key is depressed to display "4'000" "+" on the main display section (main calculation data memory 28) (steps S3 to S7). After that, as shown in (E) of FIG. 11, the "selection" key 16 is depressed to make the auxiliary display section 13 (auxiliary calculation data memory 29) active (Yes in step S8→SA (steps A1 to A3).

As shown in (F) of FIG. 11, the numerical and operation symbol keys are depressed to input "25×4=" and a euro value "100" of the calculation result is displayed on the auxiliary display section 13 (auxiliary calculation data memory 29) (steps S3 to S7).

As shown in (G) of FIG. 11, the "selection" key 16 is depressed again to make the main display section 12 (main calculation data memory 28) active (Yes in step S8→SA (A1→A4 and A5). After that, as shown in (H) of FIG. 11, the "Δ" key 17a is depressed to displace the euro value "100" from the auxiliary display section 13 to the main display section 12 and display it thereon (Yes in step S9→SB (B1→B3). The yen calculation data "4'000" and "+" which have been already calculated and displayed on the main display section 12, are saved and stored in the memorandum data memory 26.

As shown in (I) of FIG. 12, the "EXCH" key 14e is depressed two times to display, on the auxiliary display section 13 (auxiliary display data memory 25), the euro-to-yen conversion rate "110" stored in the conversion rate 2 memory 27a (Yes in step S10→SC (steps C4 to C6→C3)). When the "×EXCH" key 14e1 is depressed as shown in (J) of FIG. 12 (Yes in step S11), the euro-to-yen conversion result "11'000" obtained by multiplying the euro value "100" displayed on the main display section 12 (main calculation data memory 28) by the euro-to-yen conversion rate "110" on the auxiliary display section 13 (auxiliary calculation data memory 29), is stored in the main calculation data memory 28 and written to the main display data memory 24, and then displayed on the main display section 12 (step SD (steps D1 to D3)).

When the "+" key is depressed, as shown in (K) of FIG. 12, to calculate the last term "+¥6500" of the above calculation formula "$50+€(25×4)+¥6500", arithmetic calculation is performed in accordance with the yen calculation data "4'000" and "+" saved in the memorandum data memory 26 and the euro-to-yen conversion result "11'000" calculated and displayed on the main display section 12, and data "15'000" of the calculation result is stored in the main calculation data memory 28 and written to the main display data memory 24, and then displayed on the main display section 12 (steps S3 to S7). The depressed arithmetic symbol "+" is maintained in the main display section 12 (main display data memory 24).

When a numerical value "6500" is input as shown in (L) of FIG. 12, the calculation data "15'000" and "+" which have just been displayed on the main display section 12 (main display data memory 24) are saved in the memorandum data memory 26, and the input numerical value "6500" is displayed on the main display section 12 (main calculation data memory 28). When the "=" key is depressed, as shown in (M) of FIG. 12, arithmetic calculation "15000+6500=" is performed in accordance with the calculation data "15'000" and "+" saved in the memorandum data memory 26 and the numerical value "6500" stored in the main calculation data memory 28, and a calculation result "21'500" is written to the main display data memory 24 and displayed on the main display section 12 (steps S3 to S7).

Thus, "$50+€(25×4)+¥6500" can be converted into yen by designating a conversion transition with the "×EXCH" key 14e1 while the dollar value "50" and euro value "100", which are to be converted, are displayed on the main display section 12 and their corresponding dollar-to-conversion rate "80" and euro-to-yen conversion rate "110" are displayed in parallel on the auxiliary display section 13 according to the operation of the "EXCH" key 14e. As in the foregoing embodiment, moreover, the "selection key" 16 is depressed to select an active state between the main display section 12 (main calculation data memory 28) and the auxiliary display section 13 (auxiliary calculation data memory 29), and the "Δ" key 17a is depressed to displace the calculation result from the auxiliary display section 13 to the main display section 12, thereby obtaining the final conversion result. Accordingly, a user is able to perform his or her desired conversion process by a simple and clear operation without performing an uncertain calculating operation which necessitates a user's own memory and a conventional memory function.

The processes of the electronic calculator 10 having an auxiliary display screen according to each of the embodiments, or the entire process shown in the flowchart of FIG. 3, the selecting process shown in the flowchart of FIG. 4, the memorandum process shown in the flowchart of FIG. 5, the conversion rate displaying process shown in the flowchart of FIG. 9 and the first and second conversion processes shown in the flowcharts of FIG. 10(A) and FIG. 10(B) can be stored in a recording medium, such as a memory card (a ROM card, a RAM card, etc.), a magnetic disk (a floppy disk, a hard disk, etc.), an optical disk (a CD-ROM, a DVD, etc.) and a semiconductor memory and distributed as programs that can be executed by a computer. The computer (CPU 21) of the electronic calculator 10 having a main display section and an auxiliary display section reads the programs out of the recording medium and stores the programs in the storage unit 22. By virtue of the stored programs, the operation of the electronic calculator is controlled to achieve a function of switching an operation between the main and auxiliary display sections, a function of displacing a numerical value between them and a function of converting a numerical value as described in the above embodiments, and these functions can be performed by the foregoing processes.

Program data for achieving the foregoing processes can be transferred on a communication network as a program code. The program data is fetched into the electronic calculator 10 from a computer device (program server) connected to the communication network and stored in the storage unit 22, thereby achieving a function of switching an operation between the main and auxiliary display sections, a function of displacing a numerical value between them and a function of converting a numerical value as described above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic calculator comprising:
   first and second display sections;
   a conversion rate memory which stores a plurality of conversion rates; and
   a processor which executes processes including:
      selecting one of the first and second display sections as a display section which receives key input according to a user operation;
      displaying a numerical value on the first display section according to a user operation when the first display section is selected; and
      sequentially reading out the conversion rates from the conversion rate memory and sequentially displaying the conversion rates on the second display section, according to a user operation while the numerical value is displayed on the first display section;
      when a user operation instructs a conversion operation of multiplying or dividing the numerical value displayed on the first display section by the conversion rate displayed on the second display section, determining whether a conversion operation has already been executed using the conversion rate displayed on the second display section; and when it is determined that the conversion operation has not already been executed using the conversion rate displayed on the second display section, performing the conversion operation instructed by the user operation and displaying a result of the conversion operation on the first display section;

wherein the conversion operation instructed by the user operation is not performed when it is determined that the conversion operation has already been executed using the conversion rate displayed on the second display section.

2. The electronic calculator according to claim 1, wherein the processes executed by the processor further include:

displacing data displayed on one of the first and second display sections to the other of the first and second display sections, according to a user operation.

3. The electronic calculator according to claim 1, further comprising:

a first key which gives an instruction to perform the conversion operation by multiplying the numerical value displayed on the first display section by the conversion rate displayed on the second display section; and a second key which gives an instruction to perform the conversion operation by dividing the numerical value displayed on the first display section by the conversion rate displayed on the second display section;

wherein the conversion operation is performed according to an instruction input via the first key or the second key.

4. A method performed by a computer of an electronic device including first and second display sections and a memory which stores a plurality of conversion rates, the method comprising:

selecting one of the first and second display sections as a display section which receives key input according to a user operation;

displaying a numerical value on the first display section according to a user operation when the first display section is selected; and sequentially reading out the conversion rates from the conversion rate memory and sequentially displaying the conversion rates on the second display section, according to a user operation while the numerical value is displayed on the first display section;

when a user operation instructs a conversion operation of multiplying or dividing the numerical value displayed on the first display section by the conversion rate displayed on the second display section, determining whether a conversion operation has already been executed using the conversion rate displayed on the second display section; and when it is determined that the conversion operation has not already been executed using the conversion rate displayed on the second display section, performing the conversion operation instructed by the user operation and displaying a result of the conversion operation on the first display section;

wherein the conversion operation instructed by the user operation is not performed when it is determined that the conversion operation has already been executed using the conversion rate displayed on the second display section.

5. The method according to claim 4, further comprising:

displacing data displayed on one of the first and second display sections to the other of the first and second display sections, according to a user operation.

6. The method according to claim 4, wherein the electronic device further comprises a first key which gives an instruction to perform the conversion operation by multiplying the numerical value displayed on the first display section by the conversion rate displayed on the second display section, and a second key which gives an instruction to perform the conversion operation by dividing the numerical value displayed on the first display section by the conversion rate displayed on the second display section, and wherein the conversion operation is performed according to an instruction input via the first key or the second key.

* * * * *